United States Patent
Sugimoto et al.

(10) Patent No.: US 11,050,117 B2
(45) Date of Patent: Jun. 29, 2021

(54) COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

(71) Applicant: ZEON CORPORATION, Tokyo (JP)

(72) Inventors: Takumi Sugimoto, Tokyo (JP); Takuya Kaneda, Tokyo (JP); Kenji Arai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/492,867

(22) PCT Filed: Mar. 20, 2018

(86) PCT No.: PCT/JP2018/011161
§ 371 (c)(1),
(2) Date: Sep. 10, 2019

(87) PCT Pub. No.: WO2018/180809
PCT Pub. Date: Oct. 4, 2018

(65) Prior Publication Data
US 2020/0266408 A1    Aug. 20, 2020

(30) Foreign Application Priority Data

Mar. 31, 2017 (JP) .............................. JP2017-072476

(51) Int. Cl.
| | | |
|---|---|---|
| *H01M 50/411* | (2021.01) | |
| *H01M 4/36* | (2006.01) | |
| *H01M 4/62* | (2006.01) | |
| *H01M 50/449* | (2021.01) | |

(52) U.S. Cl.
CPC ......... *H01M 50/411* (2021.01); *H01M 4/366* (2013.01); *H01M 4/62* (2013.01); *H01M 50/449* (2021.01)

(58) Field of Classification Search
CPC ........................... H01M 2/1653; H01M 4/622
See application file for complete search history.

(56) References Cited

U.S. PATENT DOCUMENTS

| | | | | |
|---|---|---|---|---|
| 2016/0118663 A1* | 4/2016 | Maruhashi | ............ | H01M 4/622 429/217 |
| 2017/0117521 A1 | 4/2017 | Sasaki | | |
| 2017/0155107 A1 | 6/2017 | Akiike et al. | | |
| 2018/0130987 A1 | 5/2018 | Takamatsu | | |

FOREIGN PATENT DOCUMENTS

| | | |
|---|---|---|
| EP | 2960968 A1 | 12/2015 |
| JP | 2013145763 A | 7/2013 |
| JP | 2014160651 A | 9/2014 |
| WO | 2014129188 A1 | 8/2014 |
| WO | 2015198530 A1 | 12/2015 |
| WO | 2016017066 A1 | 2/2016 |
| WO | 2016084330 A1 | 6/2016 |

OTHER PUBLICATIONS

Oct. 1, 2019, International Preliminary Report on Patentability issued in the International Patent Application No. PCT/JP2018/011161.
May 1, 2018, International Search Report issued in the International Patent Application No. PCT/JP2018/011161.
Dec. 7, 2020, the Extended European Search Report issued by the European Patent Office in the corresponding European Patent Application No. 18774231.7.

* cited by examiner

*Primary Examiner* — Peter F Godenschwager
(74) *Attorney, Agent, or Firm* — Kenja IP Law PC

(57) ABSTRACT

Provided is a composition for a non-aqueous secondary battery functional layer that inhibits cissing in thin film application and enables formation of a functional layer that does not excessively increase the amount of metal deposited on an electrode during secondary battery charging. The composition for a functional layer contains organic particles, a binder, a wetting agent, and water. Content of the wetting agent is more than 1 part by mass and not more than 5 parts by mass per 100 parts by mass of the organic particles.

4 Claims, No Drawings

COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

TECHNICAL FIELD

The present disclosure relates to a composition for a non-aqueous secondary battery functional layer, a functional layer for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A secondary battery generally includes battery components such as a positive electrode, a negative electrode, and a separator that isolates the positive electrode and the negative electrode from one another and prevents short circuiting between the positive and negative electrodes. In the secondary battery, a functional layer may also be provided on these battery components with the aim of improving adhesiveness, heat resistance, and strength.

Such a functional layer is formed by, for example, applying, onto a substrate, a slurry composition (composition for a functional layer) obtained by dispersing or dissolving components such as non-conductive particles and a binder in a dispersion medium, and then drying the applied film on the substrate.

In recent years, studies have been made in order to further enhance functional layers and compositions for functional layers used in formation thereof with the aim of increasing secondary battery performance.

In one example, Patent Literature (PTL) 1 discloses a composition for a functional layer containing non-conductive particles, a water-soluble polymer having a water drop contact angle, measured by forming a film of the water-soluble polymer, that is within a specific range, and water as a dispersion medium. According to PTL 1, a functional layer having excellent adhesiveness can be formed using this composition for a functional layer.

CITATION LIST

Patent Literature

PTL 1: WO 2015/198530 A1

SUMMARY

Technical Problem

In recent years, there has been demand for further thickness reduction of functional layers included in battery components from viewpoints such as increasing secondary battery energy density. However, when the conventional composition for a functional layer described above is applied onto a substrate as a thinner film with the aim of achieving reduction of functional layer thickness, it is difficult to form a functional layer of uniform thickness because cissing occurs.

Moreover, in secondary batteries, there are cases in which metal such as lithium deposits on an electrode (particularly a negative electrode) during charging. Since deposition of a large amount of metal such as lithium on an electrode may lead to shorting between electrodes, battery components including functional layers are required to ensure various characteristics of secondary batteries such as safety and battery characteristics without causing excessive deposition of metal on an electrode during charging of the secondary battery.

Accordingly, an objective of the present disclosure is to provide a means for advantageously solving the problems set forth above.

Solution to Problem

The inventors conducted diligent investigation with the aim of solving the problems set forth above. The inventors discovered that by compounding a specific amount of a wetting agent in preparation of a composition for a functional layer obtained by dispersing and/or dissolving organic particles and a binder in an aqueous medium, it is possible to inhibit cissing when the composition for a functional layer is applied as a thin film and also to ensure various characteristics of a secondary battery without excessively increasing the amount of metal deposited on an electrode during charging of the secondary battery by using a battery component including a functional layer that is formed using the composition for a functional layer. In this manner, the inventors completed the present disclosure.

Specifically, the present disclosure aims to advantageously solve the problems set forth above by disclosing a composition for a non-aqueous secondary battery functional layer comprising organic particles, a binder, a wetting agent, and water, wherein content of the wetting agent is more than 1 part by mass and not more than 5 parts by mass per 100 parts by mass of the organic particles. By using a composition for a functional layer that contains organic particles, a binder, and a wetting agent in an aqueous medium and in which the content of the wetting agent relative to the organic particles is within the range set forth above, cissing during application as a thin film can be inhibited, and the amount of metal deposited on an electrode during secondary battery charging does not excessively increase when a battery component including a functional layer that is formed using the composition for a functional layer is used.

The term "wetting agent" as used in the present disclosure refers to a surfactant having an HLB (Hydrophile-Lipophile Balance) value of 9 or higher. The HLB value referred to in the present disclosure can be determined by the Griffin method (HLB value=20×sum total of formula weight of hydrophilic parts/molecular weight).

In the presently disclosed composition for a non-aqueous secondary battery functional layer, the wetting agent is preferably at least one selected from the group consisting of a sulfosuccinic acid ester, a salt of a sulfosuccinic acid ester, and a non-ionic surfactant. When at least one of a sulfosuccinic acid ester, a salt of a sulfosuccinic acid ester (hereinafter, the sulfosuccinic acid ester and the salt of a sulfosuccinic acid ester are also referred to collectively as a "sulfosuccinic acid ester or salt thereof"), and a non-ionic surfactant is used as the wetting agent in the composition for a functional layer, cissing during application of the composition for a functional layer as a thin film can be sufficiently inhibited.

In the presently disclosed composition for a non-aqueous secondary battery functional layer, it is preferable that the wetting agent includes a non-ionic surfactant and also includes a sulfosuccinic acid ester or salt thereof, and a ratio of content of the sulfosuccinic acid ester or salt thereof relative to content of the non-ionic surfactant is not less than 0.50 and not more than 1.50. When the composition for a functional layer contains a non-ionic surfactant and a sulfosuccinic acid ester or salt thereof and the mass ratio of these components is within the range set forth above, cissing during application of the composition for a functional layer as a thin film can be sufficiently inhibited, and foaming of the composition for a functional layer can be suppressed.

Note that when a composition for a non-aqueous secondary battery functional layer is said to "contain a sulfosuccinic acid ester or salt thereof" in the present disclosure, this means that the composition contains either or both of a sulfosuccinic acid ester and a salt of a sulfosuccinic acid ester. Moreover, the phrase "content of a sulfosuccinic acid ester or salt thereof" as used in the present disclosure means the total of content of a sulfosuccinic acid ester and content of a salt of a sulfosuccinic acid ester.

In the presently disclosed composition for a non-aqueous secondary battery functional layer, a ratio of content of the wetting agent relative to content of the binder is preferably not less than 0.01 and not more than 0.50. When the ratio of amounts of the binder and the wetting agent in the composition for a functional layer is within the range set forth above, cissing during application of the composition for a functional layer as a thin film can be sufficiently inhibited, and functional layer adhesiveness can be improved.

Moreover, the present disclosure aims to advantageously solve the problems set forth above by disclosing a functional layer for a non-aqueous secondary battery formed using any one of the compositions for a non-aqueous secondary battery functional layer set forth above. A functional layer formed using any one of the compositions for a functional layer set forth above has excellent uniformity of thickness. Moreover, the amount of metal deposited on an electrode during secondary battery charging does not excessively increase when a battery component including this functional layer is used.

Furthermore, the present disclosure aims to advantageously solve the problems set forth above by disclosing a non-aqueous secondary battery comprising the functional layer for a non-aqueous secondary battery set forth above. A secondary battery that includes the functional layer set forth above excels in terms of various characteristics such as safety and battery characteristics without an excessive increase in the amount of metal deposited on an electrode.

Advantageous Effect

According to the present disclosure, it is possible to provide a composition for a non-aqueous secondary battery functional layer that can inhibit cissing during application as a thin film and enables formation of a functional layer that does not excessively increase the amount of metal deposited on an electrode during charging of a non-aqueous secondary battery.

Moreover, according to the present disclosure, it is possible to provide a functional layer for a non-aqueous secondary battery that has excellent uniformity of thickness and does not excessively increase the amount of metal deposited on an electrode during charging of a non-aqueous secondary battery, and also to provide a non-aqueous secondary battery including this functional layer for a non-aqueous secondary battery.

DETAILED DESCRIPTION

The following provides a detailed description of embodiments of the present disclosure. The presently disclosed composition for a non-aqueous secondary battery functional layer is used as a material in production of the presently disclosed functional layer for a non-aqueous secondary battery. Moreover, the presently disclosed functional layer for a non-aqueous secondary battery is produced using the presently disclosed composition for a non-aqueous secondary battery functional layer and constitutes part of an electrode or a separator (preferably a separator), for example. Furthermore, the presently disclosed non-aqueous secondary battery includes at least the presently disclosed functional layer for a non-aqueous secondary battery.

(Composition for Non-Aqueous Secondary Battery Functional Layer)

The presently disclosed composition for a functional layer is a slurry composition that contains organic particles as non-conductive particles, a binder, and a wetting agent in an aqueous medium, and that optionally further contains other additives. A feature of the presently disclosed composition for a functional layer is that the composition contains the wetting agent in an amount of more than 1 part by mass and not more than 5 parts by mass per 100 parts by mass of the organic particles.

By using the composition for a functional layer that contains the organic particles and the binder, and that also contains the wetting agent with the specific content set forth above, cissing during application as a thin film can be inhibited, and the amount of metal deposited on an electrode during secondary battery charging does not excessively increase.

<Organic Particles>

The organic particles are particles formed by a polymer that can improve heat resistance, strength, and so forth of a functional layer. The organic particles can be stably present while maintaining their particulate form in the composition for a functional layer or in an electrolyte solution of a secondary battery. The organic particles may be one type of organic particles used individually or two or more types of organic particles used in combination.

«Glass-Transition Temperature of Organic Particles»

The glass-transition temperature of the polymer forming the organic particles (hereinafter, also referred to as "the glass-transition temperature of the organic particles") is preferably 50° C. or higher, and more preferably 100° C. or higher from a viewpoint of imparting excellent heat resistance to a functional layer. The upper limit for the glass-transition temperature of the organic particles is not specifically limited and may, for example, be set as 300° C. or lower.

The organic particles are a component that can contribute to improving heat resistance and strength of a functional layer as previously described and may also, through adjustment of the glass-transition temperature thereof, increase adhesiveness of the functional layer in conjunction with the subsequently described binder. Specifically, the glass-transition temperature of the organic particles is preferably not lower than 50° C. and lower than 100° C. from a viewpoint of improving adhesiveness of a functional layer while also ensuring heat resistance of the functional layer.

In the following description, organic particles having a glass-transition temperature of not lower than 50° C. and lower than 100° C. are also referred to as "adhesive organic particles", whereas organic particles having a glass-transition temperature of 100° C. or higher are also referred to as "strongly heat-resistant organic particles".

The "glass-transition temperature of organic particles" referred to in the present disclosure can be measured and determined by a method described in the EXAMPLES section of the present specification. The glass-transition temperature of the organic particles can be adjusted by, for example, altering the types of monomers used in production of the polymer forming the organic particles.

«Structure of Organic Particles»

The structure of the organic particles is not specifically limited. The organic particles may be particles formed by a non-composite polymer including substantially a single polymer component or may be particles formed by a composite polymer including a plurality of polymer components.

Examples of particles formed by a non-composite polymer include polyethylene particles, polystyrene particles, polydivinylbenzene particles, crosslinked styrene-divinylbenzene copolymer particles, polyimide particles, polyamide particles, polyamide imide particles, melamine resin particles, phenolic resin particles, benzoguanamine-formaldehyde condensate particles, polysulfone particles, polyacrylonitrile particles, polyaramid particles, polyacetal particles, and polymethyl methacrylate particles.

Particles formed by a composite polymer have a heterophase structure in which different polymer portions are present within the particles. In this context, a heterophase structure refers to a single particle formed by physical or chemical bonding of two or more different polymers, and not to a particle having a monophase structure formed by a single polymer such as a block polymer. Specific examples of heterophase structures include a core-shell structure including a core portion and a shell portion that at least partially covers the outer surface of the core portion; a side-by-side structure in which two or more polymers are disposed alongside one another; a snowman structure in which part of a polymer forming a central part in a core-shell structure is exposed at an outer shell; and an octopus ocellatus structure in which a spherical polymer particle has a particle of a different type of polymer embedded in the surface thereof to form a unified structure.

Of these examples, a polymer having a core-shell structure (hereinafter, also referred to simply as a "core-shell polymer") is preferable for the organic particles from a viewpoint of further reducing the amount of metal deposited on an electrode during secondary battery charging.

[Organic Particles of Core-Shell Polymer]

Organic particles that are a core-shell polymer include a core portion and a shell portion that covers the outer surface of the core portion. It is preferable that the shell portion partially covers the outer surface of the core portion from a viewpoint of increasing metal ion (for example, lithium ion) diffusivity of the organic particles and further inhibiting deposition of metal originating from these metal ions on an electrode. In other words, it is preferable that in the organic particles that are a core-shell polymer, the shell portion covers the outer surface of the core portion but does not cover the entire outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion.

Core Portion

The polymer forming the core portion (hereinafter, also referred to as the "core polymer") is not specifically limited and may be a polymer obtained through polymerization of any monomers. Examples of monomers that can be used in preparation of the core polymer include vinyl chloride monomers such as vinyl chloride and vinylidene chloride; vinyl acetate monomers such as vinyl acetate; aromatic vinyl monomers such as styrene, α-methylstyrene, styrenesulfonic acid, butoxystyrene, and vinylnaphthalene; vinylamine monomers such as vinylamine; vinylamide monomers such as N-vinylformamide and N-vinylacetamide; acid group-containing monomers such as carboxy group-containing monomers, sulfo group-containing monomers, phosphate group-containing monomers, and hydroxy group-containing monomers; (meth)acrylic acid derivatives such as 2-hydroxyethyl methacrylate; (meth)acrylic acid ester monomers such as methyl acrylate, ethyl acrylate, methyl methacrylate, ethyl methacrylate, n-butyl acrylate, and 2-ethylhexyl acrylate; (meth)acrylamide monomers such as acrylamide and methacrylamide; (meth)acrylonitrile monomers such as acrylonitrile and methacrylonitrile; fluorine-containing (meth)acrylate monomers such as 2-(perfluorohexyl)ethyl methacrylate and 2-(perfluorobutyl)ethyl acrylate; maleimide; maleimide derivatives such as phenylmaleimide; and diene monomers such as 1,3-butadiene and isoprene. One of these monomers may be used individually, or two or more of these monomers may be used in combination in a freely selected ratio.

In the present disclosure, "(meth)acryl" is used to indicate "acryl" and/or "methacryl", "(meth)acrylo" is used to indicate "acrylo" and/or "methacrylo", and "(meth)acrylate" is used to indicate "acrylate" and/or "methacrylate".

Of these monomers, (meth)acrylic acid ester monomers and (meth)acrylonitrile monomers are preferable as monomers used in production of the core polymer. In other words, the core polymer preferably includes a (meth)acrylic acid ester monomer unit or a (meth)acrylonitrile monomer unit. Note that the core polymer may include just (meth)acrylic acid ester monomer units, may include just (meth)acrylonitrile monomer units, or may include a combination of (meth)acrylic acid ester monomer units and (meth)acrylonitrile monomer units. This can increase diffusivity of metal ions in a functional layer in which the organic particles are used and can further inhibit deposition of metal originating from these metal ions on an electrode.

The phrase "includes a monomer unit" as used in the present disclosure means that "a polymer obtained with the monomer includes a repeating unit derived from the monomer".

The total proportion constituted by a (meth)acrylic acid ester monomer unit and a (meth)acrylonitrile monomer unit in the core polymer is preferably 50 mass % or more, more preferably 55 mass % or more, even more preferably 60 mass % or more, and particularly preferably 70 mass % or more, and is preferably 100 mass % or less, more preferably 99 mass % or less, even more preferably 95 mass % or less, and particularly preferably 94 mass % or less. By setting the proportion constituted by the (meth)acrylic acid ester monomer unit and the (meth)acrylonitrile monomer unit within any of the ranges set forth above, diffusivity of metal ions in a functional layer in which the organic particles are used can be increased and deposition of metal originating from these metal ions on an electrode can be further inhibited.

The core polymer may include an acid group-containing monomer unit. Examples of acid group-containing monomers include monomers having an acid group such as carboxy group-containing monomers, sulfo group-containing monomers, phosphate group-containing monomers, and hydroxy group-containing monomers.

Examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Examples of hydroxy group-containing monomers include 2-hydroxyethyl acrylate, 2-hydroxypropyl acrylate, 2-hydroxyethyl methacrylate, and 2-hydroxypropyl methacrylate.

Of these acid group-containing monomers, carboxy group-containing monomers are preferable, among which, monocarboxylic acids are preferable, and (meth)acrylic acid is more preferable.

One acid group-containing monomer may be used individually, or two or more acid group-containing monomers may be used in combination in a freely selected ratio.

The proportion constituted by the acid group-containing monomer unit in the core polymer is preferably 0.1 mass % or more, more preferably 1 mass % or more, and even more preferably 3 mass % or more, and is preferably 20 mass % or less, more preferably 10 mass % or less, and even more preferably 7 mass % or less. By setting the proportion constituted by the acid group-containing monomer unit within any of the ranges set forth above, it is possible to increase dispersibility of the core polymer during production of the organic particles and facilitate formation of a shell portion that partially covers the outer surface of the core polymer.

The core polymer preferably includes a crosslinkable monomer unit in addition to the monomer units described above. The crosslinkable monomer is a monomer that can form a crosslinked structure during or after polymerization by heating or by irradiation with energy rays. The inclusion of a crosslinkable monomer unit in the core polymer can further improve heat resistance and strength of a functional layer containing the organic particles.

Examples of crosslinkable monomers that can be used include polyfunctional monomers having at least two groups that display polymerization reactivity. Examples of such polyfunctional monomers include divinyl compounds such as allyl methacrylate and divinylbenzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylolpropane trimethacrylate and trimethylolpropane triacrylate; and epoxy group-containing ethylenically unsaturated monomers such as allyl glycidyl ether and glycidyl methacrylate. Of these polyfunctional monomers, allyl methacrylate is preferable. One crosslinkable monomer may be used individually, or two or more crosslinkable monomers may be used in combination in a freely selected ratio.

The proportion constituted by the crosslinkable monomer unit in the core polymer is preferably 0.1 mass % or more, more preferably 0.2 mass % or more, even more preferably 0.5 mass % or more, and particularly preferably 1 mass % or more, and is preferably 5 mass % or less, more preferably 4 mass % or less, even more preferably 3 mass % or less, and particularly preferably 2 mass % or less. Adhesiveness of a functional layer can be improved when the proportion constituted by the crosslinkable monomer unit is 0.1 mass % or more, whereas secondary battery life can be extended when the proportion constituted by the crosslinkable monomer unit is 5 mass % or less.

Shell Portion

The polymer forming the shell portion (hereinafter, also referred to as the "shell polymer") is not specifically limited and may be a polymer obtained through polymerization of any monomers. Specifically, examples of monomers that can be used in production of the shell polymer include the same monomers as given as examples of monomers that can be used in production of the core polymer. One of such monomers may be used individually, or two or more of such monomers may be used in combination in a freely selected ratio.

Of these monomers, aromatic vinyl monomers are preferable as monomers used for the production of the shell polymer. In other words, the shell polymer preferably includes an aromatic vinyl monomer unit. Among aromatic vinyl monomers, styrene and styrene derivatives such as styrenesulfonic acid are more preferable. Adhesiveness of a functional layer can be improved by using an aromatic vinyl monomer.

The proportion constituted by the aromatic vinyl monomer unit in the shell polymer is preferably 20 mass % or more, more preferably 40 mass % or more, even more preferably 50 mass % or more, further preferably 60 mass % or more, and particularly preferably 80 mass % or more, and is preferably 100 mass % or less, more preferably 99.5 mass % or less, and even more preferably 99 mass % or less. Adhesiveness of a functional layer can be improved by setting the proportion constituted by the aromatic vinyl monomer unit within any of the ranges set forth above.

Besides the aromatic vinyl monomer unit, the shell polymer may include an acid group-containing monomer unit. Examples of acid group-containing monomers include monomers having an acid group such as carboxy group-containing monomers, sulfo group-containing monomers, phosphate group-containing monomers, and hydroxy group-containing monomers. Specifically, examples of acid group-containing monomers that may be used include the same monomers as acid group-containing monomers that may be included in the core portion.

Of these acid group-containing monomers, carboxy group-containing monomers are preferable, among which, monocarboxylic acids are preferable, and (meth)acrylic acid is more preferable.

One acid group-containing monomer may be used individually, or two or more acid group-containing monomers may be used in combination in a freely selected ratio.

The proportion constituted by the acid group-containing monomer unit in the shell polymer is preferably 0.1 mass % or more, more preferably 1 mass % or more, and even more preferably 3 mass % or more, and is preferably 20 mass % or less, more preferably 10 mass % or less, and even more preferably 7 mass % or less. By setting the proportion constituted by the acid group-containing monomer unit within any of the ranges set forth above, dispersibility of the organic particles in a functional layer can be improved, and good adhesiveness can be displayed across the entire surface of the functional layer.

«Production Method of Organic Particles»

No specific limitations are placed on the method by which the organic particles are produced. For example, the method of polymerization in production of organic particles as a non-composite polymer may be any of solution polymerization, suspension polymerization, bulk polymerization, and emulsion polymerization, for example. Moreover, the polymerization reaction may be addition polymerization such as ionic polymerization, radical polymerization, or living radical polymerization. The polymerization may be carried out with a commonly used emulsifier (surfactant having an HLB value of lower than 9; same applies below), dispersant, polymerization initiator, chain transfer agent, or the like, and the amount thereof may also be the same as commonly used.

The organic particles produced as a non-composite polymer may be produced by seeded polymerization. For example, in a case in which a monomer composition is added to a dispersion liquid containing fine seed particles dispersed in water in the presence of an emulsifier such as sodium alkylbenzene sulfonate (water dispersion of seed particles) and seeded polymerization is carried out, even if the chemical composition of monomers used in production of the seed particles does not exactly match the chemical composition of monomers in the aforementioned monomer composition, it is possible to produce a non-composite polymer in which the seed particles and a polymer component formed through addition of the monomer composition substantially form a single polymer component.

Moreover, organic particles can be produced as a core-shell polymer, for example, by carrying out polymerization of monomer for a core polymer and monomer for a shell polymer in stages while changing the ratio of these monomers over time. Specifically, organic particles that are a core-shell polymer can be produced by continuous, multi-stage emulsion polymerization or multi-stage suspension polymerization in which a polymer produced in a preceding stage is sequentially covered by a polymer produced in a subsequent stage.

The following describes one example of a case in which organic particles that are a core-shell polymer are obtained by multi-stage emulsion polymerization.

In the polymerization, an anionic surfactant such as sodium dodecylbenzenesulfonate or sodium dodecyl sulfate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis(2-methyl-N-(2-hydroxyethyl)-propionamide) or 2,2'-azobis(2-amidinopropane) hydrochloride may be used as a polymerization initiator, for example.

The polymerization procedure involves initially mixing one or more monomers for forming the core portion and the emulsifier, and then performing emulsion polymerization as one batch to obtain a particulate polymer that forms the core portion. Organic particles that are the core-shell polymer described above can then be obtained by performing polymerization of one or more monomers for forming the shell portion in the presence of the particulate polymer forming the core portion.

In this polymerization, it is preferable that the monomers for forming the shell polymer are supplied into the polymerization system continuously or divided into a plurality of portions from a viewpoint of partially covering the outer surface of the core portion with the shell portion. As a result of the monomers for forming the shell polymer being supplied into the polymerization system in portions or continuously, the polymer forming the shell portion can be formed as particles that bond to the core portion such as to form a shell portion that partially covers the core portion.

<Binder>

The binder is a component formed by a polymer that, in a functional layer, has a function of strongly adhering battery components of a secondary battery (for example, a separator and an electrode) and that also prevents components in the functional layer, such as the previously described organic particles, from becoming detached from the functional layer.

«Glass-Transition Temperature of Binder»

The glass-transition temperature of a polymer forming the binder (hereinafter, also referred to as "the glass-transition temperature of the binder") is preferably lower than 50° C., more preferably 25° C. or lower, and even more preferably 15° C. or lower from a viewpoint of improving functional layer adhesiveness. The lower limit for the glass-transition temperature of the binder is not specifically limited and may, for example, be set as −50° C. or higher. The glass-transition temperature of the binder can be adjusted by, for example, altering the types of monomers used in production of the polymer forming the binder.

The "glass-transition temperature of a binder" referred to in the present disclosure can be measured by a method described in the EXAMPLES section of the present specification.

«Type of Binder»

No specific limitations are placed on the binder other than being a polymer having adhesive capability. A particulate polymer that can be dispersed in an aqueous medium can suitably be used as the binder.

Specifically, the binder may, for example, be a diene polymer such as a styrene-butadiene copolymer or an acrylonitrile-butadiene copolymer, an acrylic polymer, a fluoropolymer, a silicon polymer, or the like. Of these polymers, an acrylic polymer is preferable. One of these particulate polymers may be used individually, or two or more of these particulate polymers may be used in combination.

[Acrylic Polymer]

The acrylic polymer is a polymer that includes a (meth)acrylic acid ester monomer unit. In addition to the (meth)acrylic acid ester monomer unit, the acrylic polymer preferably further includes an acid group-containing monomer unit, an aromatic vinyl monomer unit, and a crosslinkable monomer unit, for example. Note that the acrylic polymer may also include other monomer units that are monomer units other than the (meth)acrylic acid ester monomer unit, the aromatic vinyl monomer unit, and the crosslinkable monomer unit.

(Meth)Acrylic Acid Ester Monomer Unit

Examples of (meth)acrylic acid ester monomers that can form the (meth)acrylic acid ester monomer unit of the acrylic polymer include the same (meth)acrylic acid ester monomers as described in the "Organic particles" section. One of these (meth)acrylic acid ester monomers may be used individually, or two or more of these (meth)acrylic acid ester monomers may be used in combination in a freely selected ratio. Of these (meth)acrylic acid ester monomers, 2-ethylhexyl acrylate is preferable.

The proportion constituted by the (meth)acrylic acid ester monomer unit in the acrylic polymer is preferably 40 mass % or more, more preferably 50 mass % or more, and even more preferably 55 mass % or more, and is preferably 80 mass % or less, more preferably 75 mass % or less, and even more preferably 70 mass % or less.

Acid Group-Containing Monomer Unit

Examples of acid group-containing monomers that can form the acid group-containing monomer unit of the acrylic polymer include the same acid group-containing monomers as described in the "Organic particles" section. One of these acid group-containing monomers may be used individually, or two or more of these acid group-containing monomers may be used in combination in a freely selected ratio. Of these acid group-containing monomers, carboxy group-containing monomers are preferable, and acrylic acid is more preferable.

The proportion constituted by the acid group-containing monomer unit in the acrylic polymer is preferably 1 mass % or more, more preferably 1.5 mass % or more, and even more preferably 2 mass % or more, and is preferably 10 mass % or less, more preferably 8 mass % or less, and even more preferably 6 mass % or less.

Aromatic Vinyl Monomer Unit

Examples of aromatic vinyl monomers that can form the aromatic vinyl monomer unit of the acrylic polymer include the same aromatic vinyl monomers as described in the "Organic particles" section. One of these aromatic vinyl monomers may be used individually, or two or more of these aromatic vinyl monomers may be used in combination in a freely selected ratio. Of these aromatic vinyl monomers, styrene is preferable.

The proportion constituted by the aromatic vinyl monomer unit in the acrylic polymer is preferably 10 mass % or more, more preferably 15 mass % or more, and even more preferably 20 mass % or more, and is preferably 50 mass % or less, more preferably 45 mass % or less, and even more preferably 40 mass % or less.

Crosslinkable Monomer Unit

Examples of crosslinkable monomers that can form the crosslinkable monomer unit of the acrylic polymer include the same crosslinkable monomers as described in the "Organic particles" section. One of these crosslinkable monomers may be used individually, or two or more of these crosslinkable monomers may be used in combination in a freely selected ratio. Of these crosslinkable monomers, allyl methacrylate is preferable.

The proportion constituted by the crosslinkable monomer unit in the acrylic polymer is preferably 0.1 mass % or more, more preferably 0.3 mass % or more, and even more preferably 0.5 mass % or more, and is preferably 6 mass % or less, more preferably 4 mass % or less, and even more preferably 3 mass % or less.

Other Monomer Units

No specific limitations are placed on other monomers that can form other monomer units and examples thereof include the same monomers as described in the "Organic particles" section, exclusive of (meth)acrylic acid ester monomers, aromatic vinyl monomers, and crosslinkable monomers. One of these other monomers may be used individually, or two or more of these other monomers may be used in combination in a freely selected ratio.

«Production Method of Binder»

No specific limitations are placed on the method by which the binder is produced. For example, the method of polymerization in production of the binder may be any of solution polymerization, suspension polymerization, bulk polymerization, and emulsion polymerization, for example. Moreover, the polymerization reaction may be addition polymerization such as ionic polymerization, radical polymerization, or living radical polymerization. The polymerization may be carried out with a commonly used emulsifier, dispersant, polymerization initiator, chain transfer agent, or the like, and the amount thereof may also be the same as commonly used.

«Content of Binder»

Although no specific limitations are placed on the content of the binder in the presently disclosed composition for a functional layer, the content of the binder per 100 parts by mass of the organic particles is preferably 10 parts by mass or more, more preferably 12 parts by mass or more, and even more preferably 15 parts by mass or more, and is preferably 35 parts by mass or less, and more preferably 30 parts by mass or less. Functional layer adhesiveness can be improved when the content of the binder is 10 parts by mass or more per 100 parts by mass of the organic particles. On the other hand, diffusivity of metal ions in a functional layer can be increased and deposition of metal originating from these metal ions on an electrode can be further inhibited when the content of the binder is 35 parts by mass or less per 100 parts by mass of the organic particles.

<Wetting Agent>

The wetting agent is a component that can contribute to improving coatability of the composition for a functional layer by increasing wettability of the composition for a functional layer with respect to a substrate.

«Type of Wetting Agent»

Although no specific limitations are placed on the wetting agent, a sulfosuccinic acid ester or salt thereof and a non-ionic surfactant are preferable from a viewpoint of sufficiently inhibiting cissing during application of the composition for a functional layer as a thin film. One wetting agent may be used individually, or two or more wetting agents may be used in combination.

[Sulfosuccinic Acid Ester or Salt Thereof]

Examples of the sulfosuccinic acid ester or salt thereof include a dialkyl sulfosuccinate or salt thereof and a monoalkyl sulfosuccinate or salt thereof. The alkyl groups of the above-described dialkyl sulfosuccinate and monoalkyl sulfosuccinate may each be a linear or branched alkyl group, or an alkyl group having an alicyclic structure.

[Non-Ionic Surfactant]

Examples of the non-ionic surfactant include polyoxyalkylene alkylaryl ether surfactants, polyoxyalkylene alkyl ether surfactants, polyoxyalkylene fatty acid ester surfactants, sorbitan fatty acid ester surfactants, silicone surfactants, acetylene alcohol surfactants, and fluorine-containing surfactants.

Specific examples of polyoxyalkylene alkylaryl ether surfactants include polyoxyethylene nonylphenyl ether, polyoxyethylene octylphenyl ether, and polyoxyethylene dodecylphenyl ether.

Specific examples of polyoxyalkylene alkyl ether surfactants include polyoxyethylene oleyl ether and polyoxyethylene lauryl ether.

Specific examples of polyoxyalkylene fatty acid ester surfactants include polyoxyethylene oleic acid ester, polyoxyethylene lauric acid ester, and polyoxyethylene distearic acid ester.

Specific examples of silicone surfactants include dimethylpolysiloxane.

Specific examples of fluorine-containing surfactants include fluoroalkyl esters.

It is preferable that both a non-ionic surfactant and a sulfosuccinic acid ester or salt thereof are used as wetting agents. By using a non-ionic surfactant and a sulfosuccinic acid ester or salt thereof in combination, cissing during application as a thin film can be sufficiently inhibited through the wetting enhancement effect of both surfactants, and foaming of the composition for a functional layer can be suppressed through defoaming properties of the sulfosuccinic acid ester or salt thereof. Therefore, by using a composition for a functional layer that contains both a non-ionic surfactant and a sulfosuccinic acid ester or salt thereof as wetting agents, a functional layer having sufficiently uniform thickness can be formed even in a situation in which the composition for a functional layer is applied as a thin film.

Although no specific limitations are placed on the ratio of content of the sulfosuccinic acid ester or salt thereof and the content of the non-ionic surfactant in the presently disclosed composition for a functional layer in a case in which both are included as wetting agents, the ratio of content of the sulfosuccinic acid ester or salt thereof relative to content of the non-ionic surfactant (sulfosuccinic acid ester or salt thereof/non-ionic surfactant) is preferably 0.50 or more, more preferably 0.60 or more, even more preferably 0.70 or more, and particularly preferably 0.83 or more, and is preferably 1.50 or less, more preferably 1.40 or less, and even more preferably 1.30 or less. When the ratio of content of the sulfosuccinic acid ester or salt thereof relative to content of the non-ionic surfactant is within any of the ranges set forth above, cissing during application of the composition for a functional layer as a thin film can be sufficiently inhibited, and foaming of the composition for a functional layer can be suppressed.

«Content of Wetting Agent»

The content of the wetting agent per 100 parts by mass of the organic particles in the presently disclosed composition for a functional layer is required to be more than 1 part by mass and not more than 5 parts by mass, is preferably 1.1 parts by mass or more, more preferably 1.2 parts by mass or more, even more preferably 1.5 parts by mass or more, and particularly preferably 2 parts by mass or more, and is preferably 4.5 parts by mass or less, and more preferably 4 parts by mass or less. Cissing during application of the composition for a functional layer as a thin film cannot be inhibited if the content of the wetting agent is 1 part by mass or less per 100 parts by mass of the organic particles. This makes it difficult to form a functional layer of uniform thickness and reduces adhesiveness of the functional layer. On the other hand, the amount of metal deposited on an electrode excessively increases if the content of the wetting agent is more than 5 parts by mass per 100 parts by mass of the organic particles. This is presumed to be a result of electrolyte solution viscosity increasing and metal ion diffusivity decreasing. Moreover, functional layer adhesiveness decreases, which is thought to be caused by blistering at adhesion sites due to the wetting agent acting as a plasticizer.

Although no specific limitations are placed on the ratio of content of the wetting agent and content of the binder in the presently disclosed composition for a functional layer, the ratio of content of the wetting agent relative to content of the binder (wetting agent/binder) is preferably 0.01 or more, more preferably 0.02 or more, even more preferably 0.05 or more, and particularly preferably 0.07 or more, and is preferably 0.50 or less, more preferably 0.40 or less, and even more preferably 0.30 or less. Cissing during application of the composition for a functional layer as a thin film can be sufficiently inhibited when the ratio of content of the wetting agent relative to content of the binder is 0.01 or more, whereas functional layer adhesiveness can be improved when this ratio is 0.50 or less.

<Other Additives>

Examples of other additives that may be contained in the presently disclosed composition for a functional layer in addition to the organic particles, binder, and wetting agent set forth above include known additives such as inorganic particles used as non-conductive particles, viscosity modifiers, and additives for electrolyte solution. Commonly known examples of such additives can be used without any specific limitations so long as they do not affect the battery reactions. One of such additives may be used individually, or two or more of such additives may be used in combination.

<Production Method of Composition for Functional Layer>

Although no specific limitations are placed on the method by which the composition for a functional layer is produced, the composition for a functional layer is typically produced by mixing the previously described organic particles, binder, wetting agent, and optionally used other additives in an aqueous medium. The method of mixing is not specifically limited and may involve mixing using a known mixer. Water is used as a main solvent of the aqueous medium and hydrophilic solvents other than water (for example, alcohols) may be mixed therewith to the extent that a state in which the components are each dissolved or dispersed can be ensured.

Note that in a situation in which the organic particles and/or binder are produced as a water dispersion, water that is used in production of the composition for a functional layer may include water that was contained in the water dispersion of the organic particles and/or binder.

(Functional Layer for Non-Aqueous Secondary Battery)

The presently disclosed functional layer is a layer that is formed from the composition for a functional layer set forth above. The presently disclosed functional layer can be formed, for example, by applying the composition for a functional layer onto the surface of a suitable substrate to form an applied film, and then drying the applied film that is formed. In other words, the presently disclosed functional layer is formed by a dried product of the composition for a functional layer set forth above. Moreover, the presently disclosed functional layer normally contains organic particles, a binder, and a wetting agent, and may optionally contain other additives. Note that in a case in which a polymer forming the organic particles and/or binder includes a crosslinkable monomer unit, the polymer including this crosslinkable monomer unit may be crosslinked during drying of the composition for a functional layer, during optional heat treatment performed after drying, or the like (i.e., the functional layer may contain a crosslinked product of the organic particles and/or the binder).

As a result of the presently disclosed functional layer being formed using the composition for a functional layer set forth above, the functional layer has uniform thickness and does not cause deposition of a large amount of metal (for example, lithium) on an electrode during secondary battery charging. Consequently, a battery component including this functional layer can be used to produce a secondary battery that excels in terms of various characteristics such as safety and battery characteristics.

<Substrate>

No limitations are placed on the substrate on which the composition for a functional layer is applied. For example, an applied film of the composition for a functional layer may be formed on the surface of a detachable substrate, the applied film may be dried to form a functional layer, and then the detachable substrate may be peeled from the functional layer. The functional layer that is peeled from the detachable substrate in this manner can be used as a free-standing film in formation of a battery component of a secondary battery. Specifically, the functional layer that is peeled from the detachable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising battery component production efficiency since a step of peeling the functional layer can be omitted.

«Separator Substrate»

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, or an aromatic polyamide resin.

«Electrode Substrate»

The electrode substrate (positive/negative electrode substrate) is not specifically limited and may, for example, be an electrode substrate obtained by forming an electrode mixed material layer on a current collector.

The current collector, an electrode active material (positive/negative electrode active material) and an electrode mixed material layer binder (positive/negative electrode mixed material layer binder) in the electrode mixed material layer, and the method by which the electrode mixed material layer is formed on the current collector may be known examples thereof such as those described in JP 2013-145763 A, for example.

<Formation Method of Functional Layer>

Examples of methods by which the functional layer may be formed on a substrate such as the separator substrate or the electrode substrate set forth above include:

(1) a method in which the presently disclosed composition for a functional layer is applied onto a surface of a separator substrate or an electrode substrate (surface at the electrode mixed material layer side in the case of an electrode substrate; same applies below) and is then dried; and (2) a method in which the presently disclosed composition for a functional layer is applied onto a detachable substrate and is dried to produce a functional layer that is then transferred onto the surface of a separator substrate or an electrode substrate.

Of these methods, method (1) is particularly preferable since it allows simple control of the thickness of the functional layer. More specifically, method (1) includes a step of applying the composition for a functional layer onto a substrate (application step) and a step of drying the composition for a functional layer that has been applied onto the substrate to form a functional layer (functional layer formation step).

«Application Step»

Examples of methods by which the composition for a functional layer can be applied onto the substrate in the application step include, but are not specifically limited to, doctor blading, reverse roll coating, direct roll coating, gravure coating, extrusion coating, and brush coating.

«Functional Layer Formation Step»

The method by which the composition for a functional layer on the substrate is dried in the functional layer formation step is not specifically limited and may be a commonly known method. Examples of drying methods that may be used include drying by warm, hot, or low-humidity air; drying in a vacuum; and drying through irradiation with infrared light, an electron beam, or the like. Although no specific limitations are placed on the drying conditions, the drying temperature is preferably 50° C. to 150° C., and the drying time is preferably 5 minutes to 30 minutes.

<Thickness of Functional Layer>

The thickness of the functional layer formed using the presently disclosed composition for a functional layer is preferably not less than 0.5 μm and not more than 5 μm. A functional layer thickness of 0.5 μm or more can sufficiently increase the heat resistance and strength of a battery component that includes the functional layer. Moreover, a functional layer thickness of 5 μm or less can improved battery characteristics (particularly output characteristics) of a secondary battery.

(Battery Component Including Functional Layer)

A battery component (separator or electrode) including the presently disclosed functional layer may include elements other than the presently disclosed functional layer set forth above in addition to the separator substrate or electrode substrate and the presently disclosed functional layer so long as the effects disclosed herein are not significantly lost. These elements other than the presently disclosed functional layer are not specifically limited and may be any elements that do not correspond to the presently disclosed functional layer.

(Non-Aqueous Secondary Battery)

The presently disclosed secondary battery includes the presently disclosed functional layer set forth above. More specifically, the presently disclosed secondary battery includes a positive electrode, a negative electrode, a separator, and an electrolyte solution, wherein the functional layer set forth above is included in at least one battery component among the positive electrode, the negative electrode, and the separator. The presently disclosed non-aqueous secondary battery excels in terms of various characteristics such as safety and battery characteristics.

<Positive Electrode, Negative Electrode, and Separator>

At least one of the positive electrode, the negative electrode, and the separator used in the presently disclosed secondary battery includes the presently disclosed functional layer. Specifically, an electrode produced by forming an electrode mixed material layer on a current collector to form an electrode substrate and then providing the presently disclosed functional layer on the electrode substrate may be used as a positive electrode or negative electrode that includes a functional layer. Moreover, a separator obtained by providing the presently disclosed functional layer on a separator substrate may be used as a separator that includes a functional layer. Examples of electrode substrates and separator substrates that can be used include the same examples as in the "Functional layer for non-aqueous secondary battery" section.

Moreover, an electrode composed of an electrode substrate such as previously described or a separator composed of a separator substrate such as previously described may be used, without any specific limitations, as a positive electrode, negative electrode, or separator that does not include a functional layer.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferred as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of organic solvents that are suitable in the case of a lithium ion secondary battery include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed secondary battery set forth above can be produced by, for example, stacking the positive electrode and the negative electrode with the separator in-between, performing rolling, folding, or the like of the resultant stack as necessary to place the resultant stack in a battery container, injecting the electrolyte solution into the battery container, and sealing the battery container. At least one component among the positive electrode, the negative electrode, and the separator is a component that is equipped with a functional layer. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer.

In the examples and comparative examples, the glass-transition temperatures of organic particles and a binder were measured and determined as described below. Also, the following methods were used to evaluate inhibition of cissing and inhibition of foaming for a composition for a functional layer and inhibition of lithium deposition on a negative electrode for a secondary battery.

<Glass-Transition Temperature>

The glass-transition temperatures of organic particles and a binder were measured as described below in accordance with the structure thereof (non-composite polymer or core-shell polymer).

[Non-Composite Polymer]

In the case of a non-composite polymer, a water dispersion of the non-composite polymer was prepared and then this water dispersion was dried to obtain a measurement sample.

A differential scanning calorimetry (DSC) curve was obtained by weighing 10 mg of the measurement sample into an aluminum pan and then measuring the measurement sample in a measurement temperature range of −100° C. to 500° C. at a heating rate of 10° C./min under conditions stipulated by JIS Z 8703 using a differential scanning calorimeter (EXSTAR DSC6220 produced by SIT Nano-Technology Inc.). Note that an empty aluminum pan was used as a reference. During the heating process, an intersection point of a base line directly before a heat absorption peak on the DSC curve at which a differential signal (DDSC) was 0.05 mW/min/mg or more and a tangent to the DSC curve at a first inflection point to appear after the heat absorption peak was taken to be the glass-transition temperature (° C.).

[Core-Shell Polymer]

For each of a core polymer and a shell polymer of a core-shell polymer, a water dispersion containing a polymer (core polymer or shell polymer) was first prepared using the monomers, various additives, and so forth used in formation of the core portion or shell portion under the same polymerization conditions as for the core portion or shell portion. The prepared water dispersion was dried to obtain a measurement sample. The glass-transition temperature Tgc (° C.) of the core polymer and the glass-transition temperature Tgs (° C.) of the shell polymer were subsequently determined in the same way as described above for a non-composite polymer.

The glass-transition temperature (° C.) of the core-shell polymer was taken to be a weighted average value of the glass-transition temperatures of the core polymer and the shell polymer that was calculated by the following formula in which Mc (%) is the proportion constituted by mass of the core portion in the whole core-shell polymer and Ms (%) is the proportion constituted by mass of the shell portion in the whole core-shell polymer.

$$\text{Glass-transition temperature of core-shell polymer (° C.)} = (Tgc \times Mc + Tgs \times Ms)/100$$

<Inhibition of Cissing>

A composition for a functional layer (solid content concentration: 15%) was applied onto an organic separator substrate (porous membrane made of polypropylene; produced by Celgard, LLC.; product name: #2500) at an application rate of 3 m/min using a wire bar (#3), and was then left for 1 hour in a 25° C. environment. A 15 cm square region was arbitrarily selected on the applied film (thickness: 0.5 μm) that had been left and the number of cissing sites in the region was counted by eye. The series of operations described above was performed three times. An average value for the number of cissing sites for these three repetitions was used to make an evaluation by the following standard. A smaller number of cissing sites (average value) indicates that the composition for a functional layer has better coatability and that a functional layer having better uniformity of thickness can be formed.

A: Number of cissing sites (average value) is 0

B: Number of cissing sites (average value) is more than 0 and less than 5

C: Number of cissing sites (average value) is not less than 5 and less than 10

D: Number of cissing sites (average value) is 10 or more

<Inhibition of Foaming>

Evaluation was based on the Ross-Miles test method described in JIS K3362. Specifically, 50 mL of a composition for a functional layer was loaded into a container (1 L graduated cylinder; Ø70; height: 414 mm) in a 25° C. environment and then 200 mL of the same composition for a functional layer was dripped therein over 30 seconds from a position 900 mm above the liquid surface of the composition for a functional layer. The height of foam from the liquid surface (maximum value) was measured 15 seconds after the end of dripping. The series of operations described above was performed three times. An average value of the foam height for these three repetitions was used to make an evaluation by the following standard. A lower foam height (average value) indicates that foaming of the composition for a functional layer is suppressed.

A: Foam height (average value) of less than 3 mm

B: Foam height (average value) of not less than 3 mm and less than 10 mm

C: Foam height (average value) of not less than 10 mm and less than 30 mm

D: Foam height (average value) of 30 mm or more

<Adhesiveness>

A separator substrate having a three layer structure of polypropylene/polyethylene/polypropylene (product name: Celgard 4550) was prepared as a separator substrate. An obtained composition for a functional layer was applied onto one side of the separator substrate and was then dried for 10 minutes at 50° C. to obtain a separator including a functional layer (thickness: 0.5 μm) at one side thereof. A rectangular shape of 100 mm in length by 10 mm in width was cut out from the prepared separator as a specimen. Cellophane tape was affixed to a test stage in advance. Note that the cellophane tape was tape prescribed by JIS Z1522. The specimen was attached to the cellophane tape with the surface of the functional layer facing downward. In this manner, the specimen was attached to the cellophane tape at the functional layer surface thereof. Subsequently, the stress at the time when the separator was peeled by pulling up one end in a vertical direction at a pulling rate of 50 mm/min was measured. The measurement was made three times. An average value of the measured values was taken to be the peel strength (N/m) and was evaluated by the following standard.

A: Peel strength of more than 65 N/m

B: Peel strength of more than 55 N/m and not more than 65 N/m

C: Peel strength of 55 N/m or less

<Inhibition of Lithium Deposition>

A produced lithium ion secondary battery was left for 24 hours in a 25° C. environment and was then subjected to a charge/discharge operation of charging to a voltage of 4.35 V with a 1 C constant current and discharging to a voltage of 2.75 V with a 1 C constant current in a 25° C. environment. The lithium ion secondary battery was then subjected to 20 cycles of charging and discharging under the same conditions in a 0° C. environment. Next, the lithium ion secondary battery was subjected to an operation of charging to 4.2 V at 1 C for 1 hour in a −15° C. environment. A negative electrode was subsequently removed from the lithium ion secondary battery in a room temperature argon environment. The area of lithium deposited on the surface of the negative electrode mixed material layer was determined and was used to calculate a lithium deposition area fraction (=(area of deposited lithium/area of surface of negative electrode mixed material layer)×100%). The lithium deposition area fraction was evaluated by the following standard.

A: Lithium deposition area fraction of not less than 0% and less than 10%

B: Lithium deposition area fraction of not less than 10% and less than 20%

C: Lithium deposition area fraction of not less than 20% and less than 30%

D: Lithium deposition area fraction of 30% or more

Example 1

<Preparation of Organic Particles>

A 5 MPa pressure-resistant vessel equipped with a stirrer was charged with 23 parts of n-butyl acrylate and 28 parts of methyl methacrylate as (meth)acrylic acid ester monomers, 4 parts of methacrylic acid as an acid group-containing monomer, 24 parts of acrylonitrile as a (meth)acrylonitrile monomer, 1.0 parts of allyl methacrylate as a crosslinkable monomer, 1 part of sodium dodecylbenzenesulfonate as an emulsifier, 150 parts of deionized water, and 0.5 parts of potassium persulfate as a polymerization initiator. These materials were sufficiently stirred and were then heated to 60° C. to initiate polymerization of a core polymer. Once the polymerization conversion rate reached 96%, heating was continued while adding 19 parts of styrene as an aromatic vinyl monomer and 1 part of methacrylic acid as an acid group-containing monomer to initiate polymerization of a shell polymer. The polymerization reaction was subsequently terminated by cooling to yield a water dispersion of organic particles that were a core-shell polymer. The glass-transition temperature of the organic particles (core-shell polymer in which a shell portion partially covered the outer surface of a core portion) as determined by the previously described method was 70° C. (In other words, the obtained organic particles were adhesive organic particles.)

<Preparation of Binder>

A reactor equipped with a stirrer was charged with 70 parts of deionized water, 0.15 parts of sodium lauryl sulfate (produced by Kao Corporation; product name: EMAL 2 F) as an emulsifier, and 0.5 parts of ammonium persulfate as a polymerization initiator, a gas phase portion of the reactor was purged with nitrogen gas, and the reactor was heated to 60° C.

A monomer mixture was obtained in a separate vessel by supplying 50 parts of deionized water, 0.5 parts of sodium dodecylbenzenesulfonate as an emulsifier, 65 parts of 2-ethylhexyl acrylate as a (meth)acrylic acid ester monomer, 30 parts of styrene as an aromatic vinyl monomer, 4 parts of acrylic acid as an acid group-containing monomer, and 1 part of allyl methacrylate as a crosslinkable monomer into the vessel and mixing these materials. The monomer mixture was continuously added to the reactor over 4 hours to carry out polymerization. Note that the polymerization reaction was carried out at a temperature of 60° C. during addition of the monomer mixture. Once this addition had ended, the reactor was further stirred for 3 hours at a temperature of 70° C. to complete the polymerization reaction and thereby yield a water dispersion containing an acrylic polymer that was a non-composite polymer as a binder. The glass-transition temperature of the acrylic polymer (non-composite polymer) as measured by the previously described method was −10° C.

<Preparation of Composition for Functional Layer>

A composition for a functional layer having a solid content concentration of 15% was prepared by mixing 100 parts (in terms of solid content) of the water dispersion of the organic particles described above, 22 parts (in terms of solid content) of the water dispersion of the binder described above, 1.9 parts of a polyoxyalkylene alkylaryl ether surfactant "SN WET 366" (product name; produced by San Nopco Limited) and 1.9 parts of dioctyl sulfosuccinate as wetting agents, and water for solid content adjustment. The obtained composition for a functional layer was used to evaluate inhibition of cissing and inhibition of foaming of the composition for a functional layer, and also to evaluate adhesiveness of a functional layer. The results are shown in Table 1.

<Preparation of Separator Including Functional Layer>

A separator substrate having a three layer structure of polypropylene/polyethylene/polypropylene (product name: Celgard 4550) was prepared as a separator substrate. The obtained composition for a functional layer was applied onto one side of the separator substrate and was then dried for 10 minutes at 50° C. This operation was also performed with respect to the opposite side of the separator substrate to form a functional layer at both sides of the separator substrate (thickness of each functional layer: 0.5 μm).

<Preparation of Positive Electrode>

A mixed liquid adjusted to a total solid content concentration of 70% was obtained by mixing 94 parts of NMC ($LiNi_{0.8}Co_{0.1}Mn_{0.1}O_2$) as a positive electrode active material, 3 parts of acetylene black (produced by Denki Kagaku Kogyo Kabushiki Kaisha; product name: HS-100) as a conductive material, and 3 parts in terms of solid content of polyvinylidene fluoride (produced by Kureha Corporation; product name: #7208) as a positive electrode binder, and then adding N-methylpyrrolidone as a solvent to the resultant mixture. The mixed liquid was mixed using a planetary mixer. In this manner, a slurry composition for a positive electrode was obtained.

The obtained slurry composition for a positive electrode was applied onto one side of aluminum foil (thickness: 20 μm) serving as a positive electrode current collector using a comma coater such as to have a thickness of approximately 150 μm after drying. Next, the aluminum foil onto which the slurry composition for a positive electrode had been applied was conveyed inside an oven having a temperature of 60° C. for 2 minutes at a speed of 0.5 m/min so as to dry the slurry composition for a positive electrode. Thereafter, the aluminum foil onto which the slurry composition for a positive electrode had been applied was heat treated for 2 minutes at a temperature of 120° C. In this manner, a positive electrode mixed material layer was formed at one side of the positive electrode current collector. Next, the same operations were performed with respect to the other side of the positive electrode current collector so as to obtain a positive electrode web including the positive electrode current collector and positive electrode mixed material layers disposed at both sides of the current collector. The positive electrode web was rolled by roll pressing to obtain a positive electrode having a positive electrode mixed material layer thickness of 80 μm at each side thereof.

<Preparation of Negative Electrode>

A mixed liquid was obtained by mixing 97 parts of artificial graphite (volume-average particle diameter: 15.6 μm) as a negative electrode active material and 1 part in terms of solid content of a 2% aqueous solution of carboxymethyl cellulose (produced by Nippon Paper Industries Co., Ltd.; product name: MAC350HC) as a thickener, adding deionized water to adjust the solid content concentration to 68%, and then performing stirring for 60 minutes at a temperature of 25° C. The obtained mixed liquid was adjusted to a solid content concentration of 62% through further addition of deionized water and was subsequently stirred for 15 minutes at a temperature of 25° C. Next, 2 parts in terms of solid content of a water dispersion of a negative electrode binder (produced by ZEON CORPORATION; product name: BM-451B; solid content concentration: 40%) was added to the mixed liquid that had been stirred, the final solid content concentration was adjusted to 52% through addition of deionized water, and stirring was continued for 10 minutes to yield a polymer mixed liquid. The polymer mixed liquid was subjected to a defoaming process under reduced pressure to yield a slurry composition for a negative electrode.

The obtained slurry composition for a negative electrode was applied onto one side of copper foil (thickness: 20 μm) serving as a negative electrode current collector using a comma coater such as to have a thickness of approximately 150 μm after drying. Next, the copper foil onto which the slurry composition for a negative electrode had been applied was conveyed inside an oven having a temperature of 60° C. for 2 minutes at a speed of 0.5 m/min so as to dry the slurry composition for a negative electrode. The copper foil onto which the slurry composition for a negative electrode had been applied was subsequently heat treated for 2 minutes at a temperature of 120° C. In this manner, a negative electrode mixed material layer was formed at one side of the negative electrode current collector. Next, the same operations were performed with respect to the other side of the negative electrode current collector so as to obtain a negative electrode web including the negative electrode current collector and negative electrode mixed material layers disposed at both sides of the current collector. The negative electrode web was rolled by roll pressing to obtain a negative electrode having a negative electrode mixed material layer thickness of 80 μm at each side thereof.

<Production of Secondary Battery>

Ten positive electrodes of 4.9 cm×5.0 cm were cut out from the positive electrode that was obtained as described above. Moreover, 20 separators of 5.5 cm×5.5 cm were cut out from the separator including a functional layer that was obtained as described above. Furthermore, 11 negative electrodes of 5.0 cm×5.2 cm were cut out from the negative electrode that was obtained as described above.

These components were stacked to obtain a laminate having a negative electrode/separator/positive electrode/separator/negative electrode/separator/positive electrode/ . . . /negative electrode layer structure. The obtained laminate was pressed for 8 seconds under pressing conditions of a temperature of 70° C. and a pressure of 1.0 MPa.

The pressed laminate was enclosed in aluminum packing serving as a casing for a non-aqueous secondary battery. Next, an electrolyte solution (electrolyte: $LiPF_6$ of 1 M in concentration; solvent: ethylene carbonate (EC)/diethyl carbonate (DEC)/vinylene carbonate (VC)=68.5/30/1.5 (volume ratio)) was injected into a space formed by the aluminum packing such that no air remained. An opening of the aluminum packing was heat sealed at 150° C. to seal closed the aluminum casing. In this manner, a laminate lithium ion secondary battery having a capacity of 800 mAh was produced.

The obtained secondary battery was used to evaluated inhibition of lithium deposition on a negative electrode. The results are shown in Table 1.

Examples 2 and 3

Organic particles, a binder, a composition for a functional layer, a separator including a functional layer, a positive electrode, a negative electrode, and a secondary battery were produced in the same way as in Example 1 with the exception that the amount of the wetting agent in preparation of the composition for a functional layer was changed as shown in Table 1. The various evaluations were also carried out. The results are shown in Table 1.

Example 4

Organic particles, a binder, a composition for a functional layer, a separator including a functional layer, a positive electrode, a negative electrode, and a secondary battery were produced in the same way as in Example 1 with the exception that a polyoxyalkylene alkylaryl ether surfactant "SN WET 980" (product name; produced by San Nopco Limited) was used instead of the polyoxyalkylene alkylaryl ether surfactant "SN WET 366" (product name; produced by San Nopco Limited) in preparation of the composition for a functional layer. The various evaluations were also carried out. The results are shown in Table 1.

Example 5

Organic particles, a binder, a composition for a functional layer, a separator including a functional layer, a positive electrode, a negative electrode, and a secondary battery were produced in the same way as in Example 1 with the exception that 3.8 parts of a polyoxyalkylene alkylaryl ether surfactant "SN WET 366" (product name; produced by San Nopco Limited) was used and dioctyl sulfosuccinate was not used as a wetting agent in preparation of the composition for a functional layer. The various evaluations were also carried out. The results are shown in Table 1.

Examples 6 and 7

Organic particles, a binder, a composition for a functional layer, a separator including a functional layer, a positive electrode, a negative electrode, and a secondary battery were produced in the same way as in Example 1 with the exception that the amount of the binder in preparation of the composition for a functional layer was changed as shown in Table 1. The various evaluations were also carried out. The results are shown in Table 1.

Example 8

A binder, a composition for a functional layer, a separator including a functional layer, a positive electrode, a negative electrode, and a secondary battery were produced in the same way as in Example 1 with the exception that polystyrene particles (non-composite polymer) prepared as described below were used instead of the core-shell polymer as organic particles in preparation of the composition for a functional layer. The various evaluations were also carried out. The results are shown in Table 1.

<Preparation of Organic Particles>

A reactor equipped with a stirrer was charged with 10 parts of polystyrene particles (weight-average molecular weight: 17,000; average particle diameter: 0.21 μm) as seed particles, 4 parts of sodium dodecylbenzenesulfonate as an emulsifier, 80 parts of styrene as an aromatic monovinyl monomer, 1 part of sodium persulfate as a polymerization initiator, and 800 parts of deionized water. Polymerization was subsequently carried out by stirring these materials for 1 hour at 80° C. while blowing nitrogen gas into the reactor. Next, an emulsion was prepared by mixing 0.5 parts of sodium persulfate as a polymerization initiator, 5 parts of styrene as an aromatic monovinyl monomer, 4.5 parts of methacrylic acid as a carboxy group-containing monomer, 0.5 parts of 2-hydroxyethyl methacrylate as a hydroxy group-containing monomer, 1 part (in terms of solid content) of a 2.5% aqueous solution of polyvinyl alcohol (degree of polymerization: 2,000; degree of saponification: 87 to 89) as a dispersion stabilizer, and 20 parts of deionized water. The emulsion was continuously added into the reactor over 3 hours at 80° C. and polymerization was completed to yield a water dispersion of organic particles (polystyrene particles) that were a non-composite polymer composed substantially of a single polymer component. The glass-transition temperature of the organic particles (polystyrene particles) as measured by the previously described method was 110° C. (i.e., the organic particles were strongly heat-resistant organic particles).

In Table 1, shown below:

"Adhesive" indicates adhesive organic particles;

"Strongly heat-resistant" indicates strongly heat-resistant organic particles;

"Core-shell" indicates core-shell polymer;

"Non-composite" indicates non-composite polymer;

"ACL" indicates acrylic polymer;

"SN366" indicates polyoxyalkylene alkylaryl ether surfactant "SN WET 366" (product name; produced by San Nopco Limited);

"SN980" indicates polyoxyalkylene alkylaryl ether surfactant "SN WET 980" (product name; produced by San Nopco Limited); and "DS" indicates dioctyl sulfosuccinate.

TABLE 1

|  |  |  |  | Example 1 | Example 2 | Example 3 | Example 4 | Example 5 |
|---|---|---|---|---|---|---|---|---|
| Composition for functional layer | Organic particles | Type | | Adhesive | Adhesive | Adhesive | Adhesive | Adhesive |
| | | Structure | | Core-shell | Core-shell | Core-shell | Core-shell | Core-shell |
| | | Content [parts by mass] | | 100 | 100 | 100 | 100 | 100 |
| | Binder | Type | | ACL | ACL | ACL | ACL | ACL |
| | | Content [parts by mass] | | 22 | 22 | 22 | 22 | 22 |
| | Wetting agents | Non-ionic surfactant | Type | SN366 | SN366 | SN366 | SN980 | SN366 |
| | | | Content [parts by mass] | 1.9 | 0.6 | 2.2 | 1.9 | 3.8 |
| | | Sulfosuccinic acid ester or | Type | DS | DS | DS | DS | — |
| | | | Content | 1.9 | 0.5 | 2.1 | 1.9 | — |

TABLE 1-continued

|  |  |  |  |  |  |  |  |
|---|---|---|---|---|---|---|---|
|  |  | salt thereof [parts by mass] |  |  |  |  |  |
|  |  | Sulfosuccinic acid ester or salt thereof/Non-ionic surfactant [—] | 1.00 | 0.83 | 0.95 | 1.00 | — |
|  |  | Content (total of wetting agents) [parts by mass] | 3.8 | 1.1 | 4.3 | 3.8 | 3.8 |
|  |  | Wetting agent/Binder [—] | 0.17 | 0.05 | 0.20 | 0.17 | 0.17 |
| Evaluations |  | Inhibition of cissing | A | B | A | A | A |
|  |  | Inhibition of lithium deposition | A | A | B | A | A |
|  |  | Adhesiveness | A | B | B | A | A |
|  |  | Inhibition of foaming | A | A | A | A | B |

|  |  |  |  | Example 6 | Example 7 | Example 8 | Comparative Example 1 | Comparative Example 2 |
|---|---|---|---|---|---|---|---|---|
| Composition for functional layer | Organic particles | Type |  | Adhesive | Adhesive | Strongly heat-resistant | Adhesive | Adhesive |
|  |  | Structure |  | Core-shell | Core-shell | Non-composite (polystyrene) | Core-shell | Core-shell |
|  |  | Content [parts by mass] |  | 100 | 100 | 100 | 100 | 100 |
|  | Binder | Type |  | ACL | ACL | ACL | ACL | ACL |
|  |  | Content [parts by mass] |  | 12 | 32 | 22 | 22 | 22 |
|  | Wetting agents | Non-ionic surfactant | Type | SN366 | SN366 | SN366 | SN366 | SN366 |
|  |  |  | Content [parts by mass] | 1.9 | 1.9 | 1.9 | 0.5 | 5.5 |
|  |  | Sulfosuccinic acid ester or salt thereof | Type | DS | DS | DS | — | — |
|  |  |  | Content [parts by mass] | 1.9 | 1.9 | 1.9 | — | — |
|  |  | Sulfosuccinic acid ester or salt thereof/Non-ionic surfactant [—] |  | 1.00 | 1.00 | 1.00 | — | — |
|  |  | Content (total of wetting agents) [parts by mass] |  | 3.8 | 3.8 | 3.8 | 0.5 | 5.5 |
|  |  | Wetting agent/Binder [—] |  | 0.32 | 0.12 | 0.17 | 0.023 | 0.25 |
| Evaluations |  | Inhibition of cissing |  | A | A | A | D | A |
|  |  | Inhibition of lithium deposition |  | A | B | B | C | D |
|  |  | Adhesiveness |  | B | A | B | C | C |
|  |  | Inhibition of foaming |  | A | A | A | D | B |

It can be seen from Table 1 that in the case of Examples 1 to 8 in which the used composition for a functional layer contained organic particles, a binder, and a wetting agent in water and had a wetting agent content within the prescribed range, cissing during application as a thin film was inhibited and the amount of metal deposited on an electrode during secondary battery charging did not excessively increase. Moreover, in Examples 1 to 8, foaming of the composition for a functional layer was inhibited and a functional layer could be caused to display excellent adhesiveness.

On the other hand, in the case of Comparative Example 1 in which the used composition for a functional layer had a wetting agent content that fell below the prescribed range, cissing during application as a thin film and foaming could not be inhibited, the amount of metal deposited on an electrode during secondary battery charging increased excessively, and functional layer adhesiveness decreased.

Furthermore, in the case of Comparative Example 2 in which the used composition for a functional layer had a wetting agent content that exceeded the prescribed range, the amount of metal deposited on an electrode during secondary battery charging increased excessively, and functional layer adhesiveness decreased.

INDUSTRIAL APPLICABILITY

According to the present disclosure, it is possible to provide a composition for a non-aqueous secondary battery functional layer that inhibits cissing during application as a thin film and enables formation of a functional layer that does not excessively increase the amount of metal deposited on an electrode during charging of a non-aqueous secondary battery.

Moreover, according to the present disclosure, it is possible to provide a functional layer for a non-aqueous secondary battery that has excellent uniformity of thickness and does not excessively increase the amount of metal deposited on an electrode during charging of a non-aqueous secondary battery, and also to provide a non-aqueous secondary battery including this functional layer for a non-aqueous secondary battery.

The invention claimed is:

1. A composition for a non-aqueous secondary battery functional layer comprising organic particles, a binder, a wetting agent, and water, wherein
   content of the wetting agent is more than 1 part by mass and not more than 5 parts by mass per 100 parts by mass of the organic particles,
   the glass-transition temperature of a polymer forming the organic particles is 50° C. or higher, and
   the glass-transition temperature of a polymer forming the binder is lower than 50° C.,
   the wetting agent includes a non-ionic surfactant,
   the wetting agent further includes a sulfosuccinic acid ester or salt thereof, and
   a mass ratio of content of the sulfosuccinic acid ester or salt thereof relative to content of the non-ionic surfactant is not less than 0.50 and not more than 1.30.

2. The composition for a non-aqueous secondary battery functional layer according to claim 1, wherein a mass ratio of content of the wetting agent relative to content of the binder is not less than 0.01 and not more than 0.50.

3. A functional layer for a non-aqueous secondary battery formed using the composition for a non-aqueous secondary battery functional layer according to claim 1.

4. A non-aqueous secondary battery comprising the functional layer for a non-aqueous secondary battery according to claim 3.

* * * * *